United States Patent
Pausan et al.

(10) Patent No.: US 10,649,165 B2
(45) Date of Patent: May 12, 2020

(54) FLAT DROP CABLE WITH FEATURES FOR ENHANCED GEL RETENTION AND STRIPABILITY

(71) Applicant: CommScope Technologies LLC, Hickory, NC (US)

(72) Inventors: Norin Paul Pausan, Rhyl (GB); David John Walker, Runcorn (GB); Kevin Vincent Bate, Warrington (GB)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/952,310

(22) Filed: Apr. 13, 2018

(65) Prior Publication Data

US 2018/0299631 A1    Oct. 18, 2018

Related U.S. Application Data

(60) Provisional application No. 62/485,368, filed on Apr. 13, 2017.

(51) Int. Cl.
*G02B 6/44* (2006.01)

(52) U.S. Cl.
CPC ......... *G02B 6/4433* (2013.01); *G02B 6/4495* (2013.01)

(58) Field of Classification Search
CPC ............................ G02B 6/4433; G02B 6/4495
See application file for complete search history.

(56) References Cited

U.S. PATENT DOCUMENTS

| | | | |
|---|---|---|---|
| 4,089,585 A | 5/1978 | Slaughter et al. |
| 4,199,225 A | 4/1980 | Chadwick et al. |
| 4,359,598 A | 11/1982 | Dey et al. |
| 4,467,138 A | 8/1984 | Brorein |
| 4,729,628 A | 3/1988 | Kraft et al. |
| 4,761,053 A | 8/1988 | Cogelia et al. |
| 4,852,965 A | 8/1989 | Mullin et al. |
| 5,448,670 A | 9/1995 | Blew et al. |
| 5,737,470 A | 4/1998 | Nagano et al. |
| 5,982,966 A | 11/1999 | Bonicel |
| 6,101,305 A | 8/2000 | Wagman et al. |

(Continued)

FOREIGN PATENT DOCUMENTS

| | | |
|---|---|---|
| CN | 202258546 U | 5/2012 |
| CN | 202393952 U | 8/2012 |

(Continued)

*Primary Examiner* — Chris H Chu
(74) *Attorney, Agent, or Firm* — Muncy, Geissler, Olds & Lowe, P.C.

(57) ABSTRACT

A flat drop cable has notches or other structures for enhancing the stripability of the jacket from a core of the flat drop cable. The notches can have an angled configuration with surfaces that converge as the notches extend into the jacket. Inner edges, or rounded valleys, at the bottoms of the notches can be positioned along a tear path that intersects the core of the flat drop cable at an angle relative to a major axis of the flat drop cable. For example, the notches can be offset from a minor axis of the flat drop cable a sufficient distance such that the notches are positioned outside a central boundary region that extends tangent to sides of the core and parallel to a minor axis of the flat drop cable. The shoulders of the notches, where the notches transition to an outer jacket wall, may also include a radius of curvature.

19 Claims, 11 Drawing Sheets

(56) References Cited

U.S. PATENT DOCUMENTS

| | | | |
|---|---|---|---|
| 6,175,677 B1 * | 1/2001 | Yang | G02B 6/4404 |
| | | | 385/114 |
| 6,370,303 B1 | 4/2002 | Fitz et al. | |
| 6,493,491 B1 | 12/2002 | Shen et al. | |
| 6,501,888 B2 | 12/2002 | Gimblet et al. | |
| 6,542,674 B1 | 4/2003 | Gimblet | |
| 6,621,964 B2 | 9/2003 | Quinn et al. | |
| 6,714,710 B2 | 3/2004 | Gimblet | |
| 6,744,954 B1 | 6/2004 | Tanaka et al. | |
| 6,836,603 B1 | 12/2004 | Bocanegra et al. | |
| 7,085,459 B2 * | 8/2006 | Conrad | G02B 6/4404 |
| | | | 385/114 |
| 7,171,087 B2 | 1/2007 | Takahashi | |
| 7,197,215 B2 | 3/2007 | Baird et al. | |
| 7,269,318 B2 * | 9/2007 | Cook | G02B 6/4482 |
| | | | 385/100 |
| 7,397,993 B1 * | 7/2008 | Nave | G02B 6/4403 |
| | | | 174/117 F |
| 7,539,380 B1 | 5/2009 | Abernathy et al. | |
| 7,567,741 B2 | 7/2009 | Abernathy et al. | |
| 7,796,853 B2 | 9/2010 | Abernathy et al. | |
| 7,813,606 B2 * | 10/2010 | Yasutomi | G02B 6/443 |
| | | | 385/100 |
| 8,023,787 B2 | 9/2011 | Katsuya et al. | |
| 8,184,935 B2 | 5/2012 | Kachmar | |
| 8,238,706 B2 | 8/2012 | Kachmar | |
| 8,290,320 B2 | 10/2012 | Kachmar | |
| 8,363,994 B2 | 1/2013 | Kachmar | |
| 8,538,216 B2 | 9/2013 | Abernathy et al. | |
| 8,712,200 B1 | 4/2014 | Abernathy et al. | |
| 8,942,526 B2 | 1/2015 | Lichtenwalner et al. | |
| 9,477,056 B2 | 10/2016 | Abernathy et al. | |
| 2002/0122639 A1 * | 9/2002 | Le Noane | G02B 6/4426 |
| | | | 385/111 |
| 2005/0013573 A1 * | 1/2005 | Lochkovic | G02B 6/4402 |
| | | | 385/128 |
| 2006/0291787 A1 | 12/2006 | Seddon | |
| 2007/0098339 A1 | 5/2007 | Bringuier et al. | |
| 2013/0094821 A1 * | 4/2013 | Logan | G02B 6/4495 |
| | | | 385/100 |
| 2014/0338968 A1 | 11/2014 | Kachmar | |
| 2017/0003470 A1 * | 1/2017 | Fahid | G02B 6/4494 |

FOREIGN PATENT DOCUMENTS

| | | | | |
|---|---|---|---|---|
| CN | 202522741 U | | 11/2012 | |
| CN | 203025396 | * | 6/2013 | |
| CN | 203025396 U | | 6/2013 | |
| CN | 105954845 | * | 9/2016 | G02B 6/4432 |
| JP | 2002090593 A | | 3/2002 | |
| JP | 2002328276 A | | 11/2002 | |
| JP | 2006065288 A | | 3/2006 | |
| JP | 200747680 A | | 2/2007 | |
| WO | WO 2010/039530 A1 | | 4/2010 | |
| WO | WO 2015/109459 A1 | | 7/2015 | |
| WO | WO 2016/086894 A1 | | 6/2016 | |

* cited by examiner

FLAT DROP CABLE WITH FEATURES FOR ENHANCED GEL RETENTION AND STRIPABILITY

This application claims the benefit of U.S. Provisional Application No. 62/485,368, filed Apr. 13, 2017, which is herein incorporated by reference.

BACKGROUND OF THE INVENTION

1. Field of the Invention

The present disclosure relates generally to fiber optic cables. More particularly, the present disclosure relates to flat drop cables.

2. Description of the Related Art

A fiber optic cable typically includes: (1) an outer jacket; (2) a core including at least one optical fiber positioned within the jacket; and (3) a plurality of strength members positioned around or incorporated into the core. The optical fiber functions to carry optical signals. A typical optical fiber includes an inner core surrounded by a cladding that is protected by a coating layer. The core can also include a buffer layer that functions to surround and protect the coated optical fiber. In certain examples, the buffer layer can include a tight buffer layer, a semi-tight buffer layer, or a loose buffer layer. The strength members of the fiber optic cable, such as aramid yarns, like the yarns sold under the trademark KEVLAR, add mechanical reinforcement to the fiber optic cable to protect the internal optical fiber against stresses applied to the cable during installation and thereafter. The strength members can also assist in attaching a connector to the cable when the cable is terminated. The outer jacket can be configured to protect the optical fiber by preventing the fiber from being exposed to outside elements.

Drop cables used in fiber optic networks can be constructed with jackets each having a flat transverse cross-sectional profile. Such cables typically include at least one central buffer tube containing at least one optical fiber, and reinforcing members such as rods made of glass reinforced epoxy, like glass reinforced plastic (GRP) rods, embedded in the jacket on opposite sides of the buffer tube. U.S. Pat. No. 6,542,674 discloses a drop cable of the type described above. Flat drop cables of the type described above are designed to be quite robust. However, as a result of such cables being strong and robust, stripping can be difficult. Improvements are needed in this area.

SUMMARY OF THE INVENTION

One aspect of the present disclosure relates to a flat drop cable having one or more structures for enhancing the stripability of the jacket from the drop cable. In certain examples, the structures for enhancing stripability can include notches. In certain examples, the notches can have an angled configuration with surfaces that converge as the notch extends into the jacket. In certain examples, the flat drop cable can define an elongated transverse cross-sectional profile having a major axis and a minor axis, and one or more notches for enhancing stripability can be offset from the minor axis of the flat drop cable. In certain examples, at least two offset notches are provided at opposite sides of the drop cable with inner edges of the notches being positioned along a plane that intersects an optical fiber of the flat drop cable. In certain examples, the notches are offset from the minor axis a sufficient distance such that the notches are positioned outside a central boundary region defined by spaced lines that are tangent to sides of a core of the fiber optic cable and that are parallel to the minor axis.

In certain embodiments, the inner edges of the notches are replaced by curved valleys having a radius of curvature. The centers of the radius of curvature of the notches reside on a plane, which intersects the major axis at an oblique angle. The shoulders of the notches, at the outer edges of the notches where the notches transition to the outer profile of the jacket, may also be rounded and have a radius of curvature. The layout and dimensioning of the radius of curvatures can assist in holding a gel around the cable, so that the gel may better seal into the notches at a point where the cable enters an enclosure.

A variety of additional aspects will be set forth in the description that follows. These aspects can relate to individual features and to combinations of features. It is to be understood that both the forgoing general description and the following detailed description are exemplary and explanatory only and are not restrictive of the broad concepts upon which the examples disclosed herein are based.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
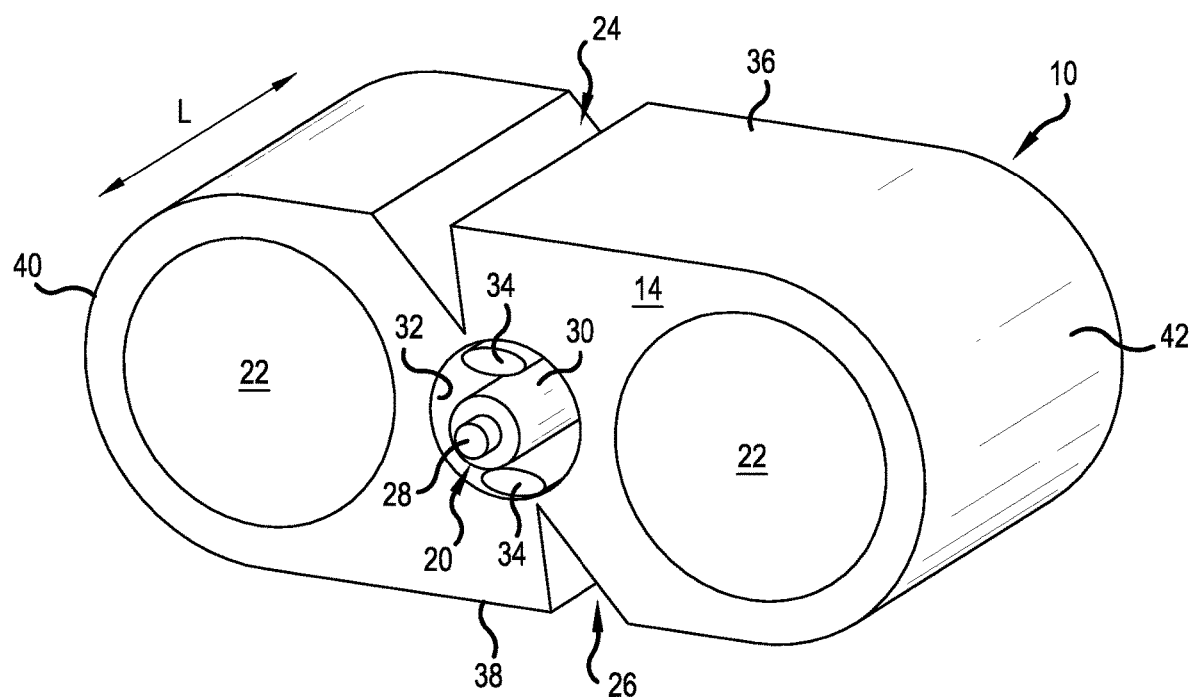
FIG. 1 is a perspective view of a segment of a flat drop cable in accordance with the principles of the present disclosure.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 1A:
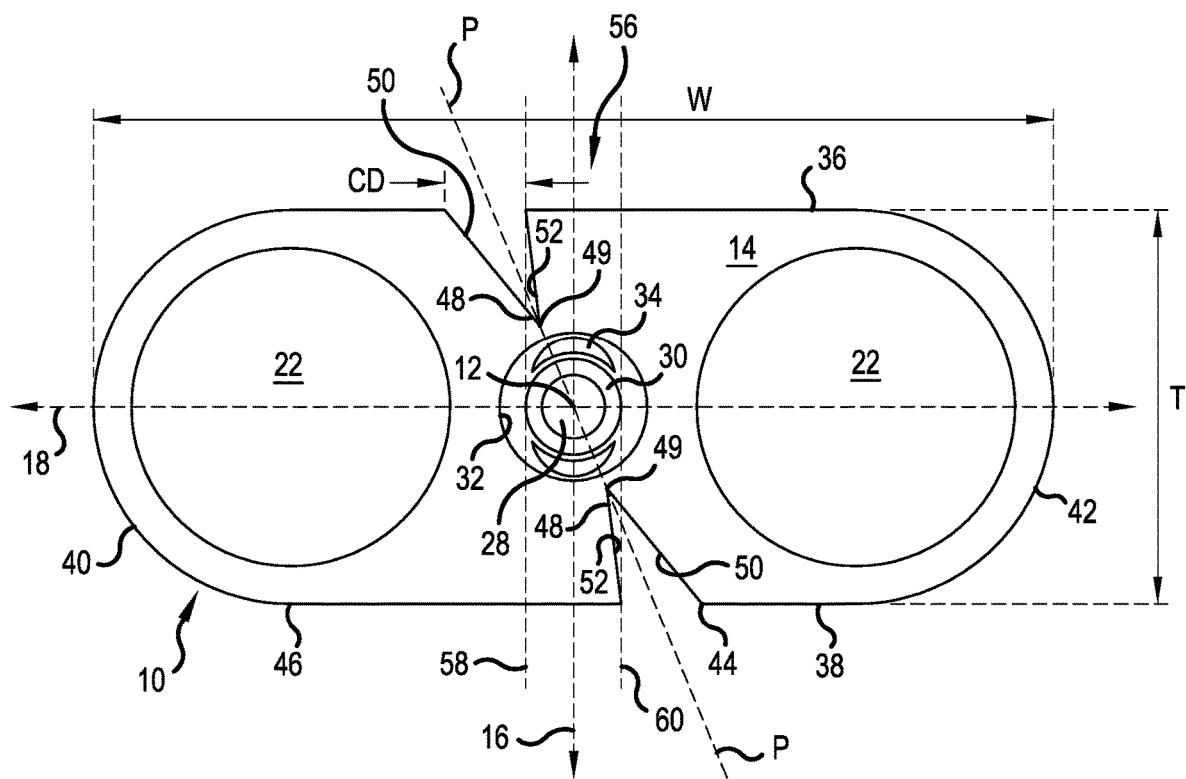
FIG. 1A is a transverse cross-sectional view of the flat drop cable of FIG. 1.

FIGS. 1 and 1A show a fiber optic cable 10 in accordance with the principles of the present disclosure. The fiber optic cable 10 includes a jacket 14, a core 20 disposed within the jacket 14, and cable reinforcing members 22 positioned within the jacket 14. The fiber optic cable 10 further includes structures for enhancing the stripability of the jacket 14 relative to the core 20. In the depicted example, such structures can include first and second notches 24, 26 defined within the jacket 14.

The depicted fiber optic cable 10 is shown as a flat drop cable having a length L, a width W, and a thickness T. The fiber optic cable 10 includes a central longitudinal axis 12 that extends along the length L of the fiber optic cable 10. The jacket 14 of the cable 10 has a transverse cross-sectional profile that is elongated such that the width W is larger than the thickness T. The transverse cross-sectional profile of the jacket 14 defines a minor axis 16 that extends along the thickness T and a major axis 18 that extends along the width W. The minor and major axes 16, 18 are perpendicular relative to one another and intersect at the central longitudinal axis 12 of the fiber optic cable 10.

The core 20 of the fiber optic cable 10 is centered generally along the central longitudinal axis 12. The cable reinforcing members 22 are positioned on opposite sides of the minor axis 16. In a preferred embodiment, the central longitudinal axis 12 is located precisely in the center of the core 20 which is also the center of fiber optic cable 10. Also in the preferred embodiment, the major axis 18 passes through the centers of the reinforcing members 22 and the core 20, and the minor axis 16 passes through the center of the core 20. The notches 24, 26 or other structures for enhancing the stripability of the jacket 14 relative to the core 20 are disposed at locations offset from the minor axis 16.

Referring still to FIGS. 1 and 1A, the core 20 of the fiber optic cable 10 includes an optical fiber 28 and a buffer layer 30 that surrounds the optical fiber 28. In certain examples, the optical fiber 28 can include a core, a cladding layer surrounding the core, and one or more polymeric coatings surrounding the cladding layer. In certain examples, the buffer layer 30 can include a buffer tube such as a tight buffer tube, a loose buffer tube, or a semi-tight buffer tube. In other examples, the core 20 may include more than one optical fiber 28. In certain examples, the core 20 extends along the entire length L of the fiber optic cable 10.

The cable reinforcing members 22 extend along the length L of the fiber optic cable 10 and are aligned along the major axis 18 of the transverse cross-sectional profile of the fiber optic cable 10. More particularly, the major axis 18 passes through the centers of the cable reinforcing members 22 so as to follow diameters of the cable reinforcing members 22. As depicted, the cable reinforcing members 22 are positioned on opposite sides of the minor axis 16 of the transverse cross-sectional profile of the fiber optic cable 10 and spaced equal distances away from the minor axis 16. In certain examples, the cable reinforcing members 22 can be configured to provide the fiber optic cable 10 with both tensile and compressive reinforcement. In certain examples, cable reinforcing members 22 can have a construction that includes epoxy reinforced with fiberglass. In other examples, the cable reinforcing members 22 can include Aramid yarn, metal rods, GRP rods or other structures.

The jacket 14 defines a central passage 32 in which the core 20 is positioned. In certain examples, strength members 34, such as water soluble fiberglass strands, can be provided in the central passage 32. In certain examples, strength members 34, such as numerous aramid yarns like KELVAR, can be provided in the central passage surrounding the buffer layer 30. In certain examples, the strength members 34 can prevent the core 20 from sticking to or being contacted by the jacket 14. In this way, fiber performance will not be affected by strain applied to the jacket 14. In certain examples, the jacket 14 includes polyethylene. In certain examples, central passage 32 is larger than the core 20 such that the core is loosely provided within the central passage 32. In certain examples, the strength members 34 assist in centering the core 20 within the central passage 32 and in preventing the core 20 from adhering to the jacket 14 during extrusion. In certain examples, the strength members 34 can include a water soluble material that swells when exposed to water so as to inhibit the intrusion of water along the central passage 32.

The jacket 14 of the fiber optic cable 10 includes opposite top and bottom sides 36, 38 that extend between opposite rounded ends 40, 42. The thickness T of the fiber optic cable 10 extends between the top and bottom sides 36, 38 while the width W of the fiber optic cable 10 extends between the rounded ends 40, 42. In the depicted example, the top and bottom sides 36, 38 are generally parallel and flat.

Figure 2:
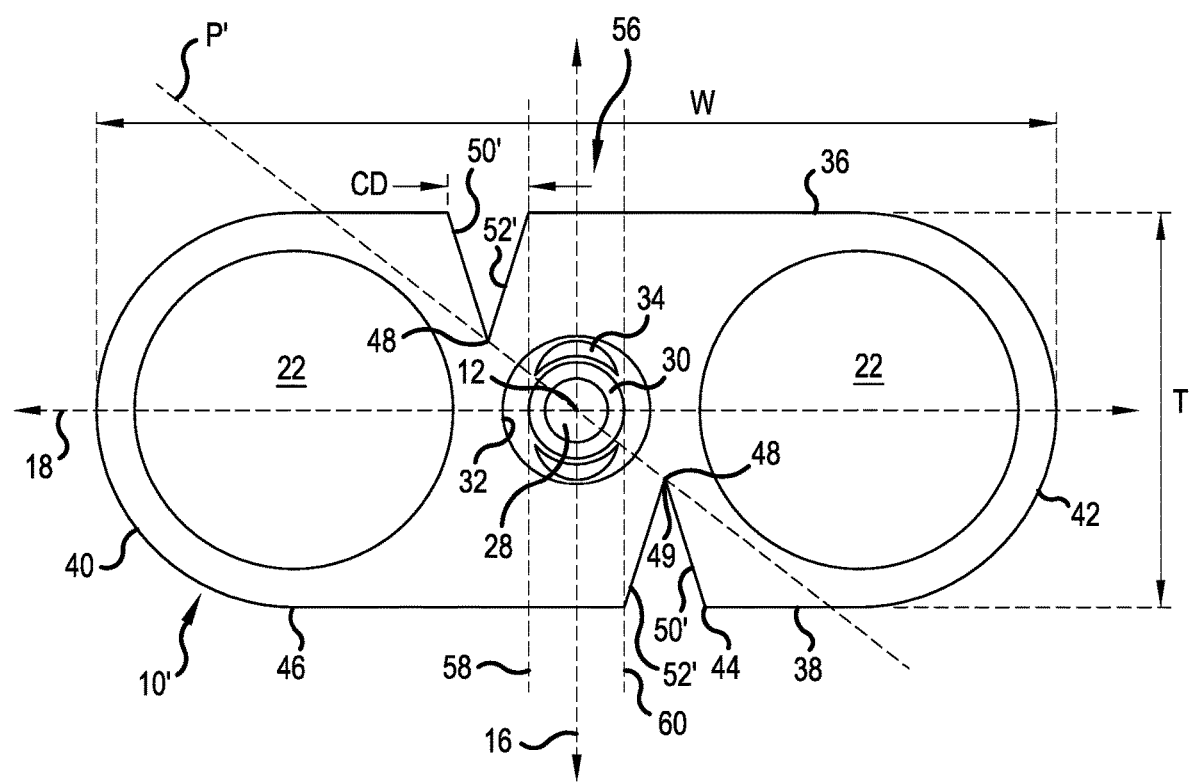
FIG. 2 is a transverse cross-sectional view of a modified flat drop cable in accordance with the principles of the present disclosure.

The notches 24, 26 are provided for facilitating stripping the jacket 14 from the core 20. As shown in FIGS. 1 and 2, the notch 24 is provided at the top side 36 of the jacket 14 and the notch 26 is provided at the bottom side 38 of the jacket 14. The notches 24, 26 have lengths that extend along the length L of the fiber optic cable 10. Each of the notches 24, 26 includes an open end 44 positioned at an exterior boundary 46 of the jacket 14 and a closed end 48 within an interior of the jacket 14. In certain examples, the open end 44 has a cross dimension CD that is larger than a corresponding cross dimension of the closed end 48. In one example, closed end 48 is defined by an inner edge 48 having a cross dimension of essentially zero. In certain examples, the inner edge 48 extends along the length L of the fiber optic cable 10 and is parallel to the central longitudinal axis 12. In certain examples, each of the notches 24, 26 has an angled or tapered configuration when viewed in transverse cross-section. For example, each of the notches 24, 26 can be defined by surfaces 50, 52 that converge as the surfaces 50, 52 extend in a direction from the open end 44 to the closed end 48. In certain examples, the closed ends 48 are defined by the inner edges 49 formed by the intersection of the surfaces 50, 52.

Referring to FIG. 1A, the notches 24, 26 are offset from the minor axis 16 and are positioned on opposite sides of the minor axis 16. For example, the notch 24 is positioned between the minor axis 16 and the rounded end 40 of the jacket 14 while the notch 26 is positioned between the minor axis 16 and the rounded end 42 of the jacket 14. In FIG. 1A, the notches 24 and 26 extend into a central boundary 56 defined between a first reference plane 58 (depicted in FIGS. 1A and 2 as a vertical line) and a second reference plane 60 (depicted in FIGS. 1A and 2 as a vertical line). The first reference plate 58 is positioned on one side of the minor axis 16 and is tangent to the core 20. The second reference plane 60 is positioned on an opposite side of the minor axis 16 and is tangent to the core 20. In the depicted example, the first and second reference planes 58, 60 are perpendicular relative to the major axis 18. In certain other examples, such as the modified cable 10' of FIG. 2, the notches 24, 26 are formed by surfaces 50' and 52' and are positioned completely outside of the central boundary 56.

Suitable positioning of the inner edges 49 of the notches 24, 26 can facilitate stripping the jacket 14 from the core 20 and accessing the core 20 after stripping. As shown in FIGS. 1A and 2, the inner edges 49 are positioned along a reference plane P, P' that intersects the core 20. In the depicted examples, the reference plane P, P' intersects the inner edges 49 and also intersects the central longitudinal axis 12 of the core 20. The notches 24, 26 form a tear path aligned along the reference plane P, P'.

For example, in certain implementations, a diagonal tear path is defined between the inner edges 49 of the notches 24, 26 along the reference plane P, P'. The diagonal tear path 49 intersects the core 20. In the depicted example, the jacket 14 is provided with only one diagonal tear path.

In certain examples, the notches 24, 26 are laterally offset from one another so that the inner edges 49 are not positioned along a reference plane that is perpendicular relative to the major axis 18. In the examples shown in FIGS. 1A and 2, only one notch 24 is provided at the top side 36 of the jacket 14 and only one notch 26 is provided at the bottom side 38 of the jacket 14; the notches 24, 26 are provided on opposite sides of the minor axis 16.

In certain examples, the surfaces 50, 52 defining the notches 24, 26 are oriented at oblique angles relative to one another and intersect at inner edges 49. In certain examples, the inner edges 49 are offset from the minor axis 16. In certain examples, the inner edges 49 of the notches 24, 26 are offset on opposite sides of the minor axis 16 from one another by equal distances.

Figure 3:
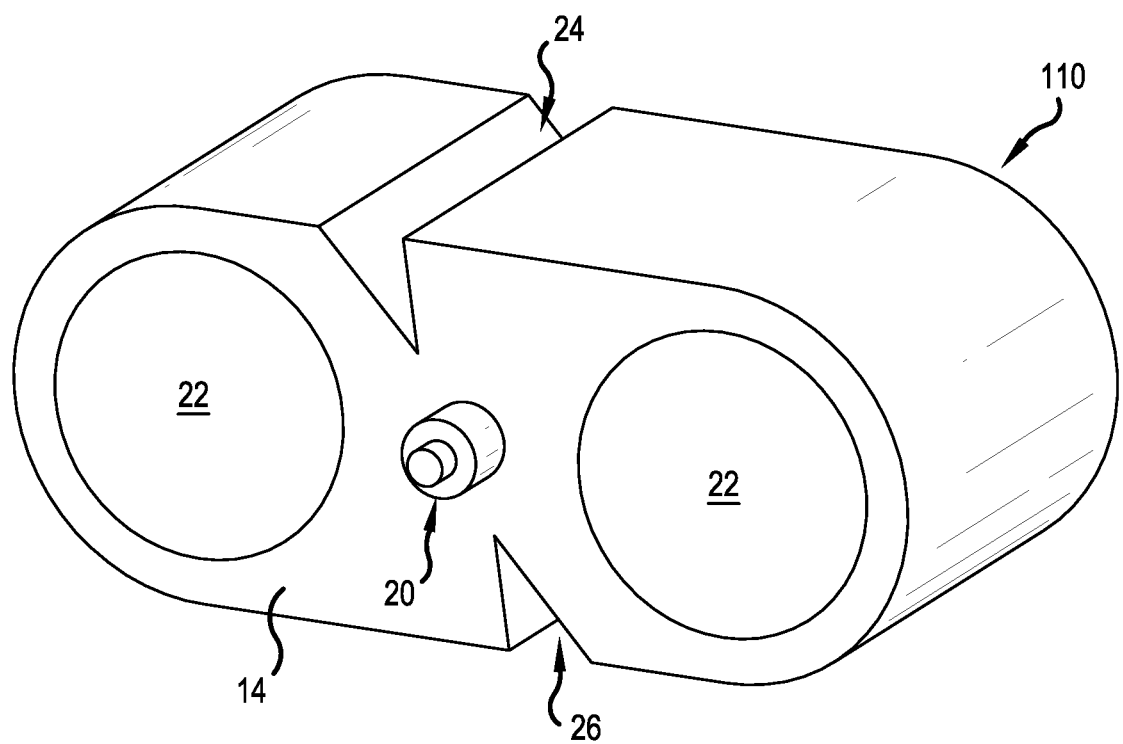
FIG. 3 is a perspective view of a segment of another flat drop cable in accordance with the principles of the present disclosure.

FIG. 3 shows another fiber optic cable 110 in accordance with the principles of the present disclosure. The fiber optic cable 110 has the same basic configuration as the fiber optic cable 10 except the jacket 14 is tightly extruded about the core 20 and no strength members 34 are provided between the core 20 and the jacket 14.

Figure 4:
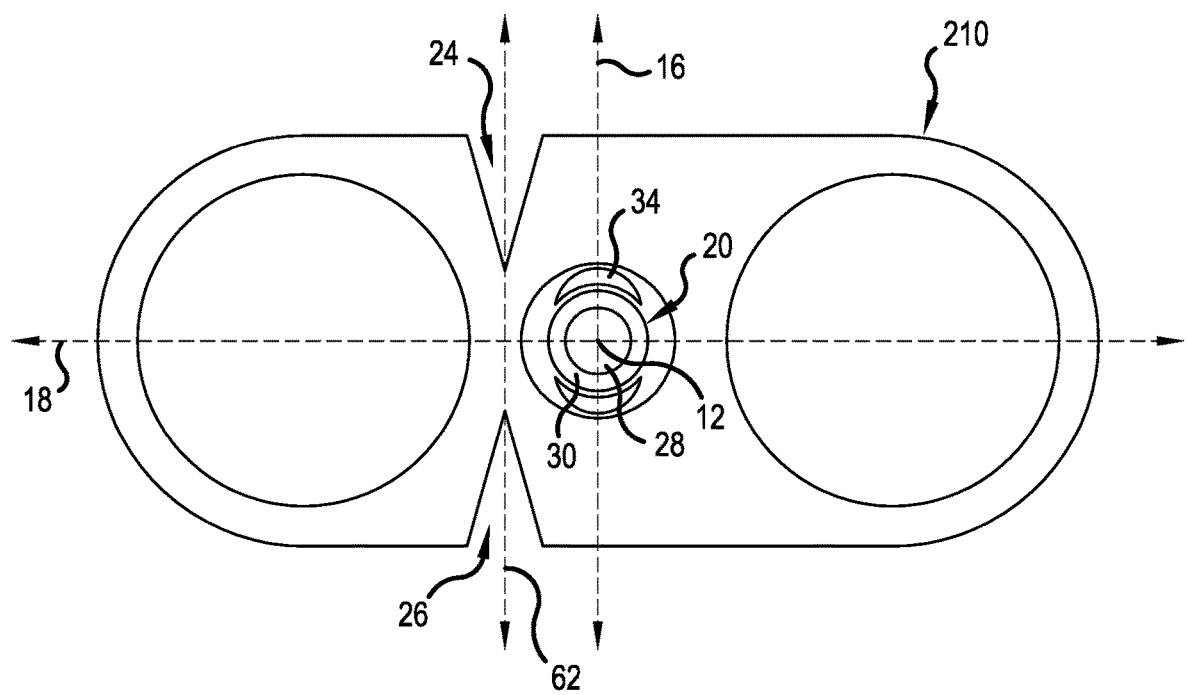
FIG. 4 is a transverse cross-sectional view of a further flat drop cable in accordance with the principles of the present disclosure.

FIG. 4 illustrates a further fiber optic cable 210 in accordance with the principles of the present disclosure. The fiber optic cable 210 includes top and bottom notches 24, 26 positioned on the same side of the minor axis 16. The notches 24, 26 are aligned along a reference plane 62 that does not intersect the core 20. The reference plane 62 is perpendicular relative to the major axis 18 and parallel to the minor axis 16.

Figure 5:
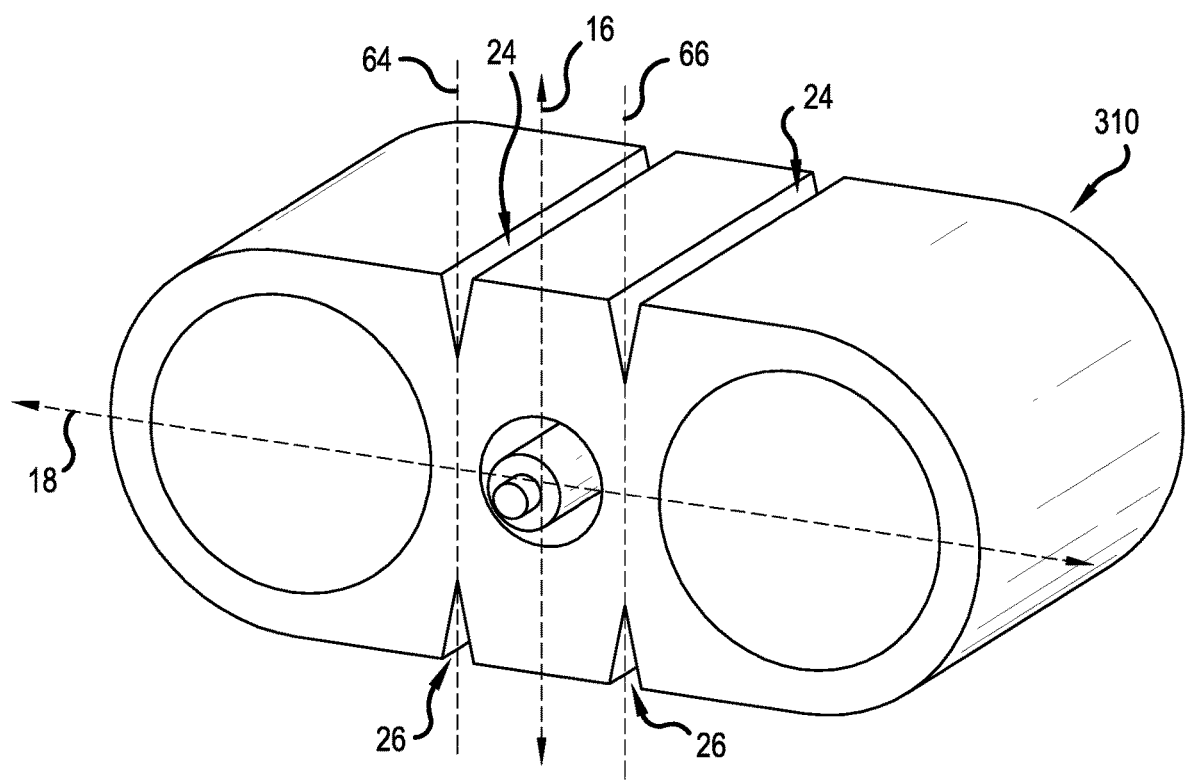
FIG. 5 is a perspective view showing a segment of still another flat drop cable in accordance with the principles of the present disclosure.

FIG. 5 illustrates still another fiber optic cable 310 in accordance with the principles of the present disclosure. The fiber optic cable 310 includes two sets of notches 24, 26 positioned on opposite sides of the minor axis 16. The notches 24, 26 of the first set are positioned along a reference plane 64 that is offset to the left of the minor axis 16 while the notches 24, 26 of the second set of notches is provided along a reference plane 66 that is offset to the right of the minor axis 16. The reference planes 64, 66 do not intersect the core 20 and are perpendicular relative to the major axis 18 and parallel to the minor axis 16.

Figure 6:
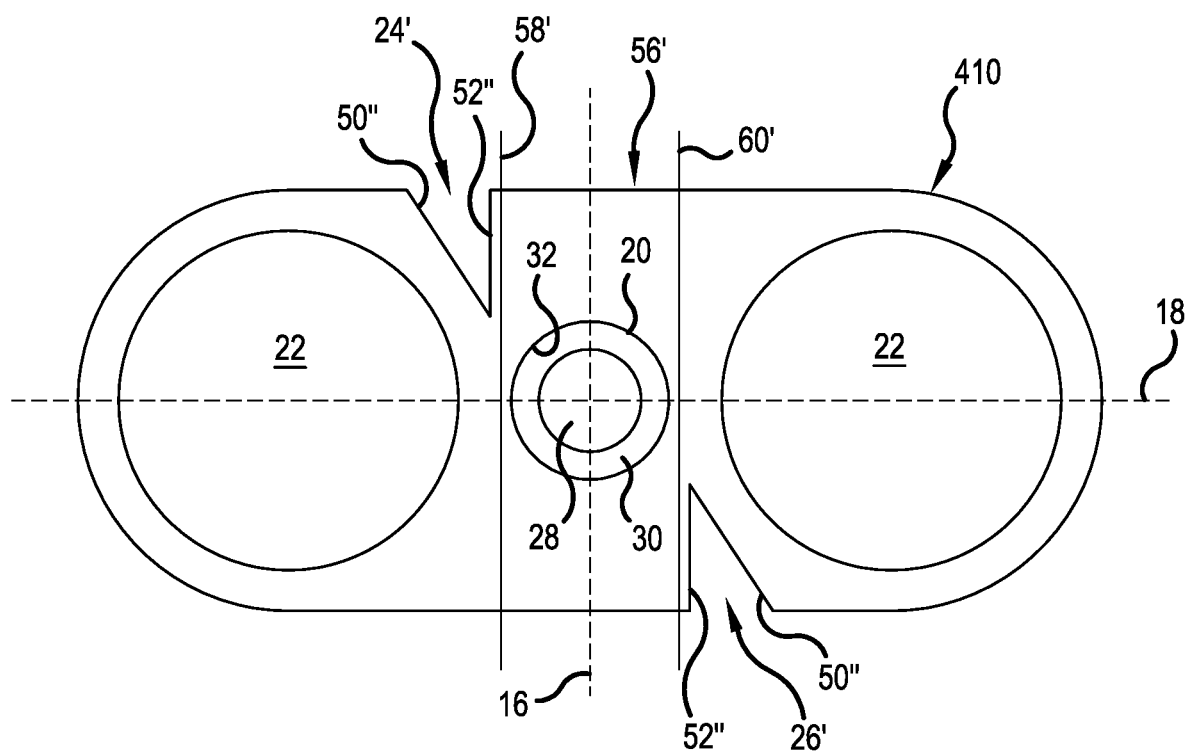
FIG. 6 is a transverse cross-sectional view of a yet another flat drop cable in accordance with the principles of the present disclosure.

FIG. 6 illustrates a further fiber optic cable 410 in accordance with the principles of the present disclosure. The fiber optic cable 410 includes top and bottom notches 24', 26' positioned on opposite sides of a central boundary 56' defined between a first reference plane 58' and a second reference plane 60' positioned on opposite sides of and tangent to the central passage 32. In some implementations, the notches 24', 26' are offset from the central boundary 56'. Each of the notches 24', 26' has a first side 50" that converges with a second side 52" as the sides 50", 52' extend into the jacket 14. In certain implementations, the second side 52" of each notch 24', 26' extends generally parallel with the minor axis 16 of the cable 410. In certain implementations, the second side 52" of each notch 24', 26' extends generally orthogonal with the major axis 18 of the cable 410.

Figure 7:
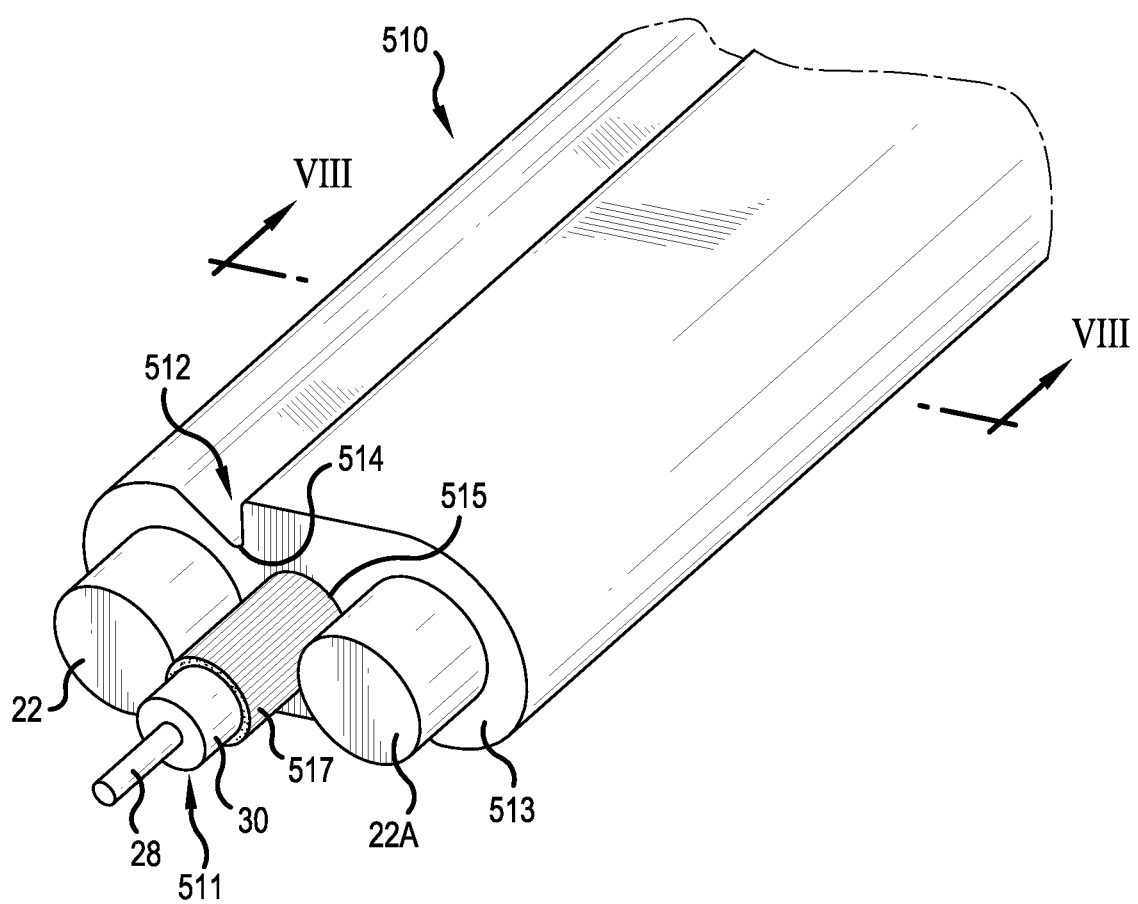
FIG. 7 is a perspective view of a fiber optic cable according to a final embodiment of the present disclosure.

FIG. 7 is a perspective view of a fiber optic cable 510 according to a final embodiment of the present disclosure.

Figure 8:
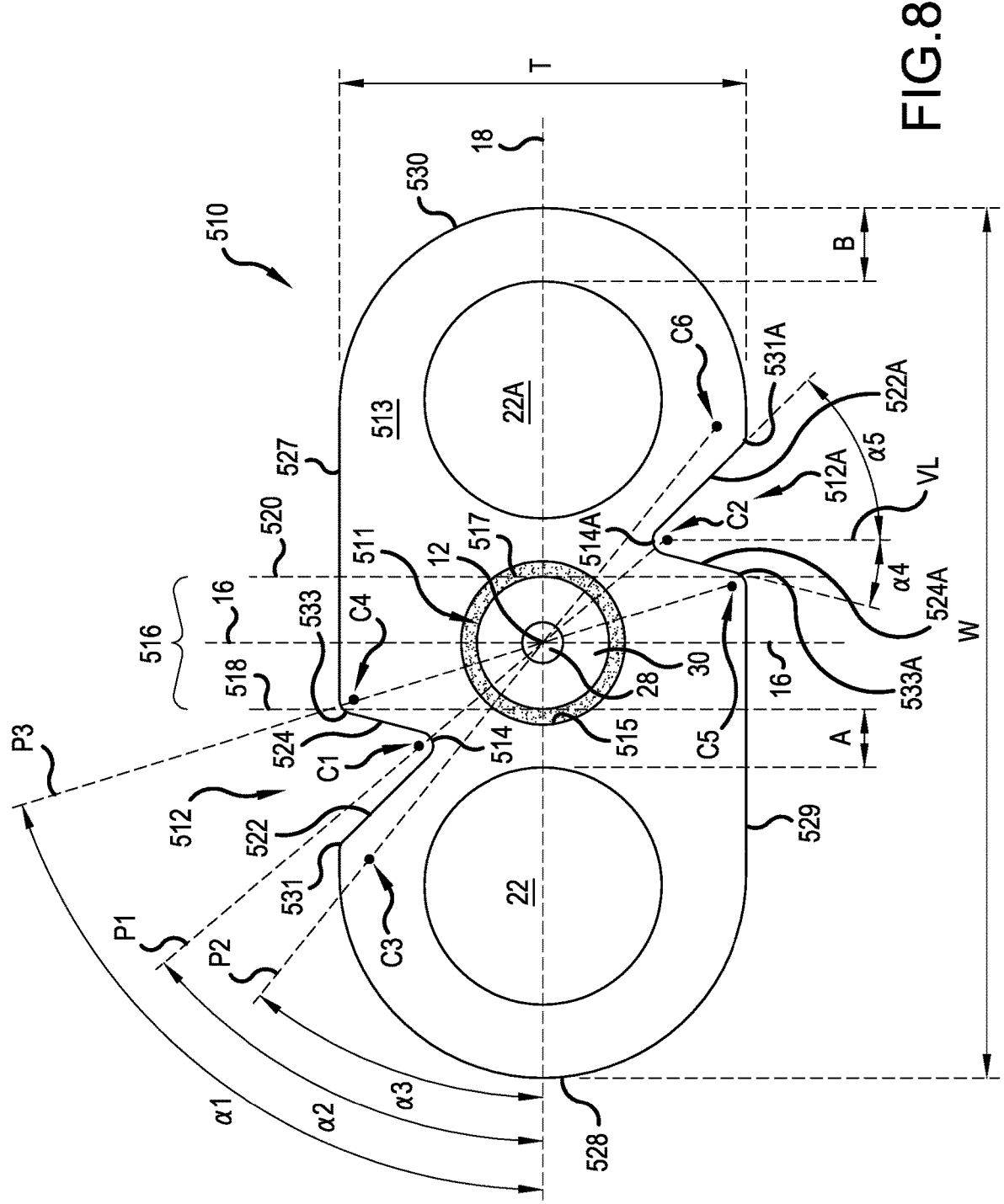
FIG. 8 is a cross sectional view taken along line VIII-VIII in FIG. 7 depicting various dimensions and angles.
Figure 9:
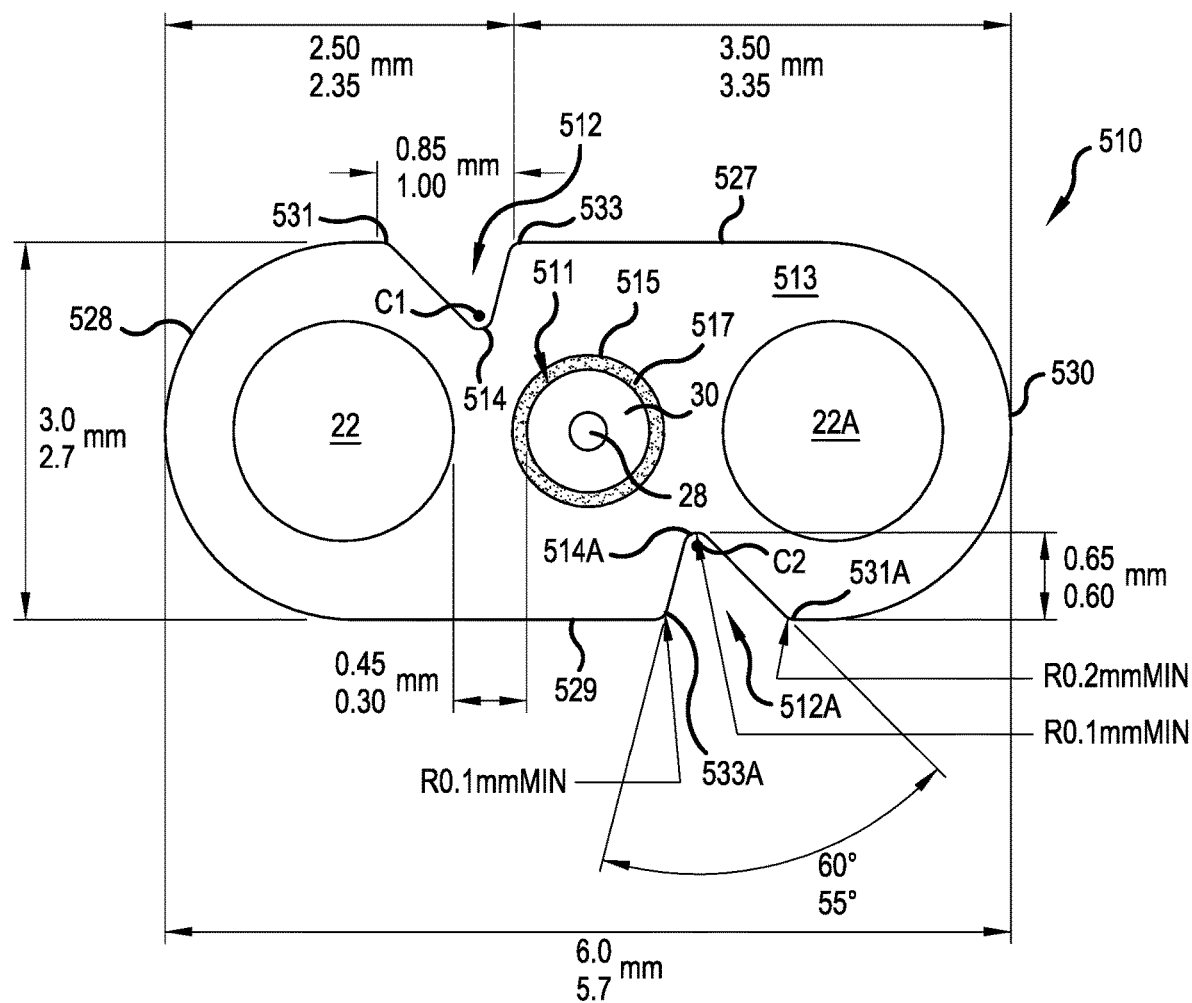
FIG. 9 is the same cross sectional view as FIG. 8, but depicting radius of curvatures and additional dimensions.

FIG. 8 is a cross section view taken along line VIII-VIII in FIG. 7 depicting various dimensions and angles. FIG. 9 is the same cross sectional view as FIG. 8, but depicting radius of curvatures and additional dimensions.

The fiber optic cable 510 is similar to the embodiment depicted in FIG. 2, as discussed above. In particular, a jacket 513 surrounds the first and second reinforcing members 22 and 22A and a core 511. The fiber optic cable 510 has a central longitudinal axis 12. The length of the jacket 513 extends along the direction of the central longitudinal axis 12 of the fiber optic cable 510. The jacket 513 defines a transverse cross-sectional profile (FIGS. 8 and 9) having a thickness T and a width W. For example, the thickness T may be in the range of 2.4 mm to 3.7 mm, such as in the range of 2.7 mm to 3.0 mm, and the width W may be in the range of 5 mm to 7 mm, such as in the range of 5.7 mm to 6.0 mm. The thickness T is smaller than the width W. A periphery thickness B of the jacket 513 surrounding the first and second reinforcing members 22 and 22A might be approximately 0.4 to 0.6 mm, such as 0.5 to 0.55 mm.

The transverse cross-sectional profile (FIG. 8) of the jacket 513 defines a major axis 18 that extends across the width W of the jacket 513 and a minor axis 16 that extends across the thickness T of the jacket 513. The major axis 18 is perpendicular to the minor axis 16. Both the major axis 18 and the minor axis 16 are perpendicular to the central longitudinal axis 12 of the fiber optic cable 510. The major axis 18 and the minor axis 16 intersect each other at the central longitudinal axis 12. The first and second reinforcing members 22 and 22A are centered on the major axis 18, i.e., the major axis passes through the centers of the first and second reinforcing members 22 and 22A. Also, the centers of the first and second reinforcing members 22 and 22A are located equal distances apart from the minor axis 16 on opposite sides of the minor axis 16. For example, the closest side of the first strength member 22 to the closest edge of the core 511 as a distance A, which could be in the range of 0.20 mm to 0.55 mm, such as in the range of 0.25 mm to 0.5 mm, such as 0.30 mm to 0.45 mm. The central axis 12 may also coincide with the center of the core 511.

The core 511 is positioned within the jacket 513 and extends along the central longitudinal axis 12. The core 511 includes at least one optical fiber 28 surrounded by a buffer 30. The buffer 30 resides within a circular, cylindrical channel 515 formed within the jacket 513, with the center of the circular, cylindrical channel 515 coinciding with the central longitudinal axis 12. In one embodiment, the buffer 30 may have a diameter of 0.9 mm and tightly surround the optical fiber 28. A plurality of strength members 517 such as aramid yarns, like those sold under the trademark KELVAR, may reside between an inner wall of the circular, cylindrical channel 515 and the core 511. Alternatively, the strength members 517 may be formed as plural water blocking elements.

A first open-sided notch 512 is formed in the jacket 513. The first open-sided notch 512 extends along the length L of the jacket 513. The first open-sided notch 512 is positioned at a location offset from the minor axis 16, wherein the first open-sided notch 512 includes an inner portion closest to the core and the inner portion is formed as a rounded valley 514. In one embodiment, the first open-sided notch 512 is provided in a part of the jacket 513 outside of an area 516 between first and second lines 518 and 520 that are tangent to the core 511 and that are perpendicular to the major axis 18.

The first open-sided notch 512 is defined by first and second surfaces 522 and 524 that are formed at an oblique angle relative to one another and that converge as the first and second surfaces 522 and 524 extend into the jacket 513 to attach to sides of the first rounded valley 514. As best seen in FIG. 8, the oblique angle between the first and second surfaces 522 and 524 is denoted by the combination of angles α4 and α5. For example, the oblique angle α4 and α5 between the first and second surfaces 522 and 524 may reside between 35 degrees and 70 degrees, such as between 45 degrees and 60 degrees. In a particular embodiment, angle α4 exists between a vertical line VL (perpendicular to the major axis 18) and the second surface 524. Angle α5 exists between the vertical line VL and the first surface 522. Angle α4 is between 5 to 15 degrees and angle α5 is between 40 to 45 degrees. Also, angle α4 is about one third of angle α5.

In one embodiment, the fiber optic cable 510 also includes a second open-sided notch 512A formed in the jacket 513 that extends along the length of the jacket 513. The second open-sided notch 512A is positioned at a location offset from the minor axis 16, wherein the second open-sided notch 512A includes an inner portion closest to the core 511 and the inner portion is formed as a second rounded valley 514A. The second open-sided notch 512A is defined by third and fourth surfaces 524A and 522A that are formed at an oblique angle (α4 combined with α5) relative to one another and that converge as the third and fourth surfaces 524A and 522A extend into the jacket to attach to sides of the second rounded valley 514A. Basically, the second open-sided notch 512A is mirror symmetrical to the first open-sided notch 512, if the mirror passes through the central longitudinal axis 12 at a 45 degree angle relative to the major axis 18.

In one embodiment, the jacket 513 defines first and second sides 527 and 529 separated by the thickness T and first and second rounded ends 528 and 530 separated by the width W. The first open-sided notch 512 is formed in the first side 527 of the jacket 513 between the minor axis 16 and the first rounded end 528 of the jacket 513. The second open-sided notch 512A is formed in the second side 529 of the jacket 513 between the minor axis 16 and the second rounded end 530. The first rounded valley 514 has a first radius of curvature and the second rounded valley 514A has a second radius of curvature. A first line P1 passes through a center C1 of the first radius of curvature and passes through a center C2 of the second radius of curvature also passes through the central longitudinal axis 12 of the fiber optic cable 510. The first radius of curvature is between 0.05 mm and 0.2 mm and wherein the second radius of curvature is between 0.05 mm and 0.2 mm. In a preferred embodiment, the first radius of curvature equals the second radius of curvature, and both are at least 0.1 mm.

In one embodiment, the first line P1 forms a first angle α2 relative to the major axis 18 of the fiber optic cable 510. The first angle is between 40 to 60 degrees. For example, the first angle α2 is between 47 to 50 degrees.

Preferably, the first side 527 is flat except for the first open-sided notch 512, and the second side 529 is flat except for the second open-sided notch 512A. A first shoulder 531 is formed between the first surface 522 and the flat first side 527 of the jacket 513. The first shoulder 531 has a third radius of curvature. A second shoulder 533 is formed between the second surface 524 and the flat first side 527 of the jacket 513. The second shoulder 533 has a fourth radius of curvature. In a preferred embodiment, the third radius of curvature is at least 0.2 mm and the fourth radius of curvature is at least 0.1 mm. In a preferred embodiment, the distance between the first shoulder and the second shoulder is in the range of 0.75 to 1.1 mm, such as between 0.85 and 1.00 mm.

Due to the mirror symmetrical configuration, a third shoulder 533A is formed between the third surface 524A and the flat second side 529 of the jacket 513. The third shoulder 533A has a fifth radius of curvature. A fourth shoulder 531A is formed between the fourth surface 522A and the flat second side 529 of the jacket 513. The fourth shoulder 531A has a sixth radius of curvature. In one embodiment, the third radius of curvature is equal to the sixth radius of curvature and the fourth radius of curvature is equal to the fifth radius of curvature. In the illustrated embodiment, the first, second fourth and fifth radiuses of curvature are approximately equal to a first value, and the third and sixth radiuses of curvature are approximately twice the first value.

A second line P2 passes through a center C3 of the third radius of curvature and passes through a center C6 of the sixth radius of curvature and also passes through the central longitudinal axis 12 of the fiber optic cable 510. A third line P3 passes through a center C4 of the fourth radius of curvature and passes through a center C5 of the fifth radius of curvature and also passes through the central longitudinal axis 12 of the fiber optic cable 510. The second line P2 forms a second angle α3 relative to the major axis 18 of the fiber optic cable 510. In one embodiment, the second angle α3 is between 25 to 50 degrees, such as between 35 to 40 degrees. The third line P3 forms a third angle α1 relative to the major axis 18 of the fiber optic cable 510. In one embodiment, the third angle α1 is between 60 to 85 degrees, such as between 70 to 75 degrees.

Figure 10:
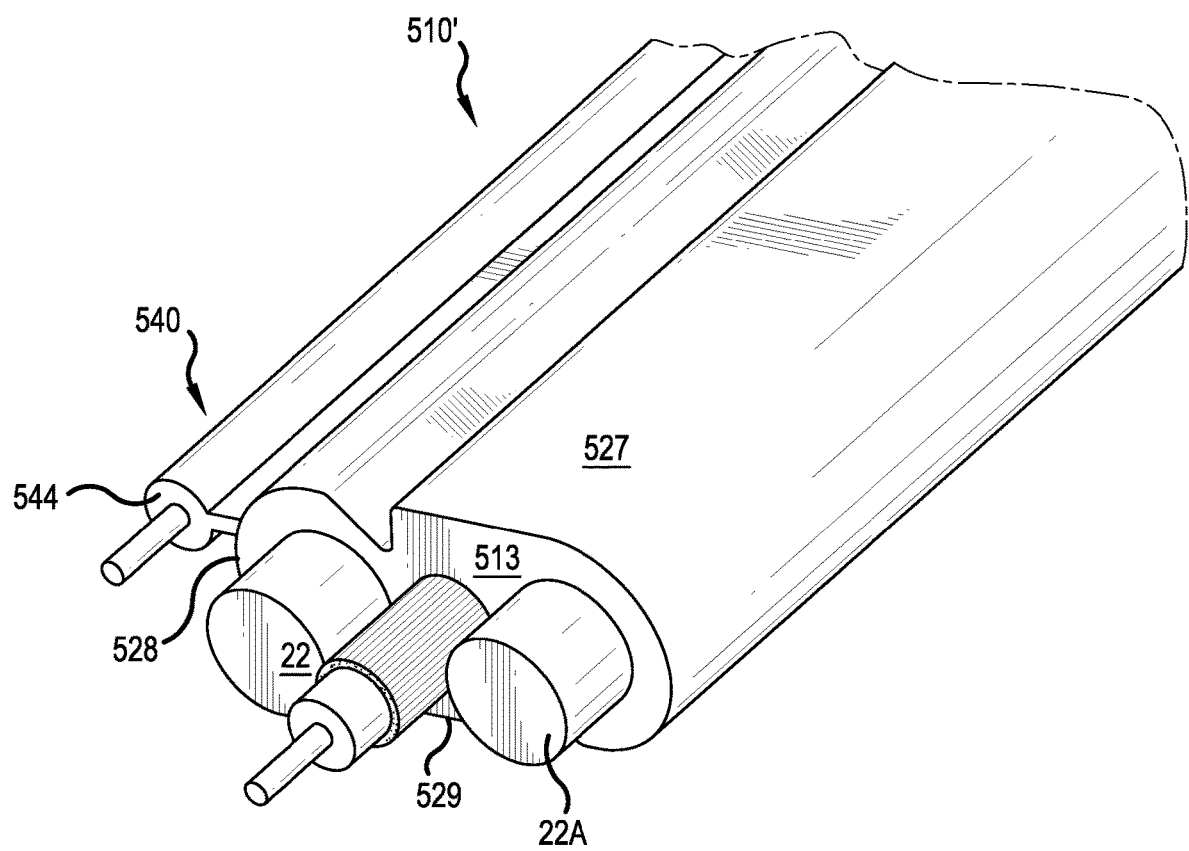
FIG. 10 is a perspective view of a modified fiber optic cable, like FIG. 7, except with the addition of a messenger wire.

FIG. 10 is a perspective view of a modified fiber optic cable 510', similar to the fiber optic cable 510 of FIG. 7. The modified fiber optic cable 510' may be identically formed, except for the addition of a messenger wire 540. The messenger wire 540 may include a copper or copper-clad-steel wire 542 surrounded by a messenger jacket 544. The messenger jacket 544 is connected to the first rounded end 528 by a web 546. In a preferred embodiment, the material used to form the messenger jacket 544, the web 546 and the jacket 513 is a common material, which is extruded at one time to form the modified fiber optic cable 510'.

The positioning and dimensioning of the centers C1, C2, C3, C4, C5 and C6 of the radius of curvatures relative to the overall fiber optic cable 510 assist in holding a gel around the cable 510. Typical gels used to seal cables interact with the curved surfaces and adhere to the curved surface and within the first and second open-sided notches 512 and 512A. Such gels may be used to seal the fiber optic cable 510 as it passes into an enclosure, such as the enclosure sold under the trademark TENIO by the assignee of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A fiber optic cable having a central longitudinal axis, the fiber optic cable comprising:
a jacket having a length that extends along the central longitudinal axis of the fiber optic cable, the jacket defining a transverse cross-sectional profile having a thickness and a width, the thickness being smaller than the width, the transverse cross-sectional profile of the jacket defining a major axis that extends across the width of the jacket and a minor axis that extends across the thickness of the jacket, the major and minor axes being perpendicular to one another and also being perpendicular to the central longitudinal axis of the fiber optic cable, and the major axis and the minor axis intersecting each other at the central longitudinal axis;
a core, including an optical fiber and a cylindrical buffer layer surrounding the optical fiber, positioned within the jacket, wherein the central longitudinal axis extends along within an outer cylindrical perimeter of the buffer layer; and
an open-sided notch formed in the jacket that extends along the length of the jacket, the open-sided notch being positioned at a location offset from the minor axis, wherein the open-sided notch includes an inner portion closest to the core and the inner portion is formed as an empty rounded valley, wherein tearing the jacket at the inner portion of the open-sided notch leads to access of the buffer layer within the jacket, wherein the open-sided notch is a first open-sided notch, the rounded valley is a first rounded valley having a first radius of curvature, and the first radius of curvature is at least 0.1 mm.

2. The fiber optic cable of claim 1, wherein the open-sided notch is provided in a part of the jacket outside of an area between first and second lines that are tangent to the outer perimeter of the optical fiber and the buffer layer and that are perpendicular to the major axis.

3. The fiber optic cable of claim 1, wherein the open-sided notch is defined by first and second surfaces that are formed at an oblique angle relative to one another and that converge as the first and second surfaces extend into the jacket to attach to sides of the rounded valley.

4. The fiber optic cable of claim 3, wherein the oblique angle between the first and second surfaces is between 35 degrees and 70 degrees.

5. The fiber optic cable of claim 3, further comprising:
a second open-sided notch formed in the jacket that extends along the length of the jacket, the second open-sided notch being positioned at a location offset from the minor axis, wherein the second open-sided notch includes an inner portion closest to the core and the inner portion is formed as an empty second rounded valley, wherein tearing the jacket at the inner portion of the second open-sided notch leads to access of the buffer layer within the jacket, wherein the second open-sided notch is defined by third and fourth surfaces that are formed at an oblique angle relative to one another and that converge as the third and fourth surfaces extend into the jacket to attach to sides of the second rounded valley.

6. The fiber optic cable of claim 5, wherein the jacket defines first and second sides separated by the thickness and first and second rounded ends separated by the width, wherein the first open-sided notch is formed in the first side of the jacket between the minor axis and the first rounded end of the jacket, wherein the second open-sided notch is formed in the second side of the jacket between the minor axis and the second rounded end, wherein the second rounded valley has a second radius of curvature, and wherein a first line passing through a center of the first radius of curvature and passing through a center of the second radius of curvature also passes through the central longitudinal axis of the fiber optic cable.

7. The fiber optic cable of claim 6, wherein the second radius of curvature is at least 0.1 mm, and wherein the first line forms a first angle relative to the major axis of the fiber optic cable, and wherein the first angle is between 40 to 60 degrees.

8. The fiber optic cable of claim 6, wherein the first side is flat except for the first open-sided notch, and wherein the second side is flat except for the second open-sided notch.

9. The fiber optic cable of claim 8, wherein a first shoulder is formed between the first surface and the flat first side of the jacket and the first shoulder has a third radius of curvature, wherein a second shoulder is formed between the second surface and the flat first side of the jacket and the second shoulder has a fourth radius of curvature, wherein a third shoulder is formed between the third surface and the flat second side of the jacket and the third shoulder has a fifth radius of curvature, and wherein a fourth shoulder is formed between the fourth surface and the flat second side of the jacket and the fourth shoulder has a sixth radius of curvature.

10. The fiber optic cable of claim 9, wherein a second line passing through a center of the third radius of curvature and passing through a center of the sixth radius of curvature also passes through the central longitudinal axis of the fiber optic cable, and wherein a third line passing through a center of the fourth radius of curvature and passing through a center of the fifth radius of curvature also passes through the central longitudinal axis of the fiber optic cable.

11. The fiber optic cable of claim 10, wherein the first angle of the first line is between 47 and 50 degrees, wherein the second line forms a second angle relative to the major axis of the fiber optic cable and the second angle is between 35 to 40 degrees, and wherein the third line forms a third angle relative to the major axis of the fiber optic cable and the third angle is between 70 to 75 degrees.

12. A fiber optic cable having a central longitudinal axis, the fiber optic cable comprising:
- a jacket having a length that extends along the central longitudinal axis of the fiber optic cable, the jacket defining a transverse cross-sectional profile having a thickness and a width, the thickness being smaller than the width, the jacket also defining first and second sides separated by the thickness and first and second rounded ends separated by the width;
- a first reinforcing member embedded in the jacket proximate the first rounded end;
- a second reinforcing member embedded in the jacket proximate the second rounded end;
- a core, including an optical fiber and a cylindrical buffer layer surrounding the optical fiber, positioned within the jacket, wherein the central longitudinal axis extends along within an outer cylindrical perimeter of the buffer layer;
- wherein a transverse cross-sectional profile of the jacket defines a major axis that extends across the width of the jacket and intersects centers of the first reinforcing member, the second reinforcing member and the core;
- wherein the transverse cross-sectional profile of the jacket also defines a minor axis that extends across the thickness of the jacket, the major and minor axes being perpendicular to one another and also being perpendicular to the central longitudinal axis of the fiber optic cable, the major axis and the minor axis intersecting each other at the central longitudinal axis;
- a first open-sided notch formed in the first side of the jacket, the first open-sided notch extending along the length of the jacket, the first open-sided notch being positioned at a location between the minor axis and the first rounded end, the first open-sided notch being defined by first and second surfaces that are formed at an oblique angle relative to one another and that converge as the first and second surfaces extend into the jacket, wherein the first and second surfaces are connected by a first empty rounded valley at an inner portion of the first open-sided notch, and wherein tearing the jacket at the inner portion of the first open-sided notch leads to access of the buffer layer within the jacket; and
- a second open-sided notch formed in the second side of the jacket, the second open-sided notch extending along the length of the jacket, the second open-sided notch being positioned at a location between the minor axis and the second rounded end, the second open-sided notch being defined by third and fourth surfaces that are formed at an oblique angle relative to one another and that converge as the third and fourth surfaces extend into the jacket, wherein the third and fourth surfaces are connected by a second empty rounded valley at an inner portion of the second open-sided notch, wherein tearing the jacket at the inner portion of the second open-sided notch leads to access of the buffer layer within the jacket, wherein the first rounded valley has a first radius of curvature and the second rounded valley has a second radius of curvature, wherein the first radius of curvature is at least 0.1 mm, and wherein the second radius of curvature is at least 0.1 mm.

13. The fiber optic cable of claim 12, wherein the oblique angle between the first and second surfaces is between 45 degrees and 60 degrees and the oblique angle between the third and fourth surfaces is between 45 degrees and 60 degrees, and wherein a first line passing through a center of the first radius of curvature and passing through a center of the second radius of curvature also passes through the central longitudinal axis of the fiber optic cable.

14. The fiber optic cable of claim 13, wherein the first side is flat except for the first open-sided notch, and wherein the second side is flat except for the second open-sided notch, wherein a first shoulder is formed between the first surface and the flat first side of the jacket and the first shoulder has a third radius of curvature, wherein a second shoulder is formed between the second surface and the flat first side of the jacket and the second shoulder has a fourth radius of curvature, wherein a third shoulder is formed between the third surface and the flat second side of the jacket and the third shoulder has a fifth radius of curvature, and wherein a fourth shoulder is formed between the fourth surface and the flat second side of the jacket and the fourth shoulder has a sixth radius of curvature, wherein a second line passing through a center of the third radius of curvature and passing through a center of the sixth radius of curvature also passes through the central longitudinal axis of the fiber optic cable, and wherein a third line passing through a center of the fourth radius of curvature and passing through a center of the fifth radius of curvature also passes through the central longitudinal axis of the fiber optic cable.

15. The fiber optic cable of claim 14, wherein the first line forms a first angle relative to the major axis of the fiber optic cable and the first angle is between 47 and 50 degrees, wherein the second line forms a second angle relative to the major axis of the fiber optic cable and the second angle is between 35 to 40 degrees, wherein the third line forms a third angle relative to the major axis of the fiber optic cable and the third angle is between 70 to 75 degrees, and wherein the central longitudinal axis passes through the center of the core.

16. The fiber optic cable of claim 14, wherein the first, second, fourth and fifth radiuses of curvature are each approximately equal to a first value, and wherein the third and sixth radiuses of curvature are each approximately equal to a second value, and wherein the second value is twice the first value.

17. The fiber optic cable of claim 12, wherein the first side is flat except for the first open-sided notch, and wherein the second side is flat except for the second open-sided notch.

18. The fiber optic cable of claim 1, further comprising:
a gel fully seated into, and in contact with all portions of, the first radius of curvature of the first rounded valley.

19. The fiber optic cable of claim 12, further comprising:
a gel fully seated into, and in contact with all portions of, the first radius of curvature of the first rounded valley and the second radius of curvature of the second rounded valley.

\* \* \* \* \*